(12) United States Patent
Meschkat (10) Patent No.: US 9,274,687 B1
(45) Date of Patent: Mar. 1, 2016

(54) MANAGING SCHEDULE CHANGES FOR CORRELATED CALENDAR EVENTS

(71) Applicant: Google Inc., Mountain View, CA (US)

(72) Inventor: Steffen Meschkat, Zurich (CH)

(73) Assignee: GOOGLE INC., Mountain View, CA (US)

( * ) Notice: Subject to any disclaimer, the term of this patent is extended or adjusted under 35 U.S.C. 154(b) by 192 days.

(21) Appl. No.: 14/051,578

(22) Filed: Oct. 11, 2013

(51) Int. Cl.
  *G06F 15/00* (2006.01)
  *G06F 13/00* (2006.01)
  *G06F 3/0484* (2013.01)

(52) U.S. Cl.
  CPC .................................. *G06F 3/0484* (2013.01)

(58) Field of Classification Search
  CPC .................................................. G06F 3/0484
  USPC ......... 715/853, 739, 751–753, 765, 738, 723, 715/763, 772
  See application file for complete search history.

(56) References Cited

U.S. PATENT DOCUMENTS

| | | | |
|---|---|---|---|
| 4,807,154 A | 2/1989 | Scully et al. |
| 4,817,018 A | 3/1989 | Cree et al. |
| 4,866,611 A | 9/1989 | Cree et al. |
| 5,050,077 A | 9/1991 | Vincent |
| 5,070,470 A | 12/1991 | Scully et al. |
| 5,093,901 A | 3/1992 | Cree et al. |
| 5,113,380 A | 5/1992 | Levine |
| 5,124,912 A | 6/1992 | Hotaling et al. |
| 5,261,045 A | 11/1993 | Scully et al. |
| 5,299,304 A | 3/1994 | Williams et al. |
| 5,323,314 A | 6/1994 | Baber et al. |
| 5,513,323 A | 4/1996 | Williams et al. |
| 5,530,852 A | 6/1996 | Meske, Jr. et al. |
| 5,692,125 A | 11/1997 | Schloss et al. |
| 5,732,399 A | 3/1998 | Katiyar et al. |
| 5,745,360 A | 4/1998 | Leone et al. |
| 5,774,867 A | 6/1998 | Fitzpatrick et al. |
| 5,842,177 A | 11/1998 | Haynes et al. |

(Continued)

FOREIGN PATENT DOCUMENTS

EP    1109121    6/2001

OTHER PUBLICATIONS

Balderston, Jim, "Fulcrum Boosts Middleware Links to Web", InfoWorld, vol. 18, No. 25. Jun. 17, 1996.

(Continued)

*Primary Examiner* — Kevin Nguyen
(74) *Attorney, Agent, or Firm* — Young Basile Hanlon & MacFarlane P.C.

(57) ABSTRACT

A method of managing schedule changes for correlated calendar events. The method includes receiving, at one or more computing devices, a first calendar event including an event designation as a parent event and receiving a second calendar event including an event designation as a child event. The method further includes receiving, at the one or more computing devices, an indication of event dependency between the second calendar event and the first calendar event. If an indication is received that the first calendar event is cancelled, the method further includes cancelling, using the one or more computing devices, the second calendar event. If an indication is received that the first calendar event is rescheduled at a temporal interval from a first event time, the method further includes rescheduling, using the one or more computing devices, the second calendar event from a second event time based on the temporal interval.

20 Claims, 4 Drawing Sheets

(56) References Cited

U.S. PATENT DOCUMENTS

| | | |
|---|---|---|
| 5,867,822 A | 2/1999 | Sankar |
| 5,933,810 A | 8/1999 | Okawa |
| 5,963,913 A | 10/1999 | Henneuse et al. |
| 6,016,478 A | 1/2000 | Zhang et al. |
| 6,101,480 A | 8/2000 | Conmy et al. |
| 6,167,379 A | 12/2000 | Dean et al. |
| 6,216,110 B1 | 4/2001 | Silverberg |
| 6,370,566 B2 | 4/2002 | Discolo et al. |
| 6,636,888 B1 | 10/2003 | Bookspan et al. |
| 6,732,103 B1 | 5/2004 | Strick et al. |
| 6,781,920 B2 | 8/2004 | Bates et al. |
| 6,988,128 B1 | 1/2006 | Alexander et al. |
| 7,082,402 B2 | 7/2006 | Conmy et al. |
| 7,096,232 B2 | 8/2006 | Doss et al. |
| 7,222,156 B2 | 5/2007 | Gupta et al. |
| 7,283,970 B2 | 10/2007 | Cragun et al. |
| 7,299,193 B2 | 11/2007 | Cragun et al. |
| 7,343,313 B2 | 3/2008 | Dorenbosch et al. |
| 7,379,888 B1 | 5/2008 | Mahapatro |
| 7,395,221 B2 | 7/2008 | Doss et al. |
| 7,421,401 B2 | 9/2008 | Demsky et al. |
| 7,519,663 B1 | 4/2009 | Bostick et al. |
| 7,679,518 B1 | 3/2010 | Pabla et al. |
| 7,747,752 B2 | 6/2010 | Pedersen |
| 7,752,066 B2 | 7/2010 | Doss et al. |
| 7,865,387 B2 | 1/2011 | Mansour |
| 8,738,723 B1 | 5/2014 | Faaborg et al. |
| 2001/0014866 A1 | 8/2001 | Conmy et al. |
| 2001/0037229 A1 | 11/2001 | Jacobs et al. |
| 2001/0054072 A1 | 12/2001 | Discolo et al. |
| 2002/0049733 A1 | 4/2002 | Orlick |
| 2002/0131565 A1 | 9/2002 | Scheuring et al. |
| 2002/0194246 A1 | 12/2002 | Moskowitz et al. |
| 2003/0061087 A1 | 3/2003 | Srimuang |
| 2003/0103415 A1 | 6/2003 | Bates et al. |
| 2003/0130882 A1 | 7/2003 | Shuttleworth et al. |
| 2003/0149605 A1 | 8/2003 | Cragun et al. |
| 2003/0149606 A1 | 8/2003 | Cragun et al. |
| 2003/0233265 A1 | 12/2003 | Lee et al. |
| 2004/0064585 A1 | 4/2004 | Doss et al. |
| 2004/0078436 A1 | 4/2004 | Demsky et al. |
| 2004/0088362 A1 | 5/2004 | Curbow et al. |
| 2004/0093290 A1 | 5/2004 | Doss et al. |
| 2004/0111307 A1 | 6/2004 | Demsky et al. |
| 2004/0128304 A1 | 7/2004 | Rokosz |
| 2004/0193458 A1 | 9/2004 | Bear |
| 2004/0194110 A1 | 9/2004 | McKee et al. |
| 2004/0221010 A1 | 11/2004 | Butler |
| 2004/0249776 A1 | 12/2004 | Horvitz et al. |
| 2004/0261013 A1 | 12/2004 | Wynn et al. |
| 2005/0038687 A1 | 2/2005 | Galdes |
| 2005/0065832 A1 | 3/2005 | Virta |
| 2005/0091095 A1 | 4/2005 | Wilbrink et al. |
| 2005/0202817 A1 | 9/2005 | Sudit |
| 2005/0256754 A1 | 11/2005 | Nastacio |
| 2005/0273372 A1 | 12/2005 | Bowne et al. |
| 2005/0288987 A1 | 12/2005 | Sattler et al. |
| 2006/0031326 A1 | 2/2006 | Ovenden |
| 2006/0047557 A1 | 3/2006 | Bieselin et al. |
| 2006/0047577 A1 | 3/2006 | Dietz et al. |
| 2006/0123011 A1 | 6/2006 | Stillion et al. |
| 2006/0184885 A1 | 8/2006 | Hayes et al. |
| 2006/0218027 A1 | 9/2006 | Carrion |
| 2006/0293943 A1 | 12/2006 | Tischhauser et al. |
| 2007/0005409 A1 | 1/2007 | Boss et al. |
| 2007/0008911 A1 | 1/2007 | MacFarlane et al. |
| 2007/0022075 A1 | 1/2007 | Horvitz et al. |
| 2007/0071209 A1 | 3/2007 | Horvitz et al. |
| 2007/0239509 A1 | 10/2007 | Kaminsky et al. |
| 2007/0250366 A1 | 10/2007 | Nurmi |
| 2007/0282654 A1 | 12/2007 | Sarkar |
| 2008/0033778 A1 | 2/2008 | Boss et al. |
| 2008/0046514 A1 | 2/2008 | Daughtry et al. |
| 2008/0091504 A1 | 4/2008 | Lyle et al. |
| 2008/0134041 A1 | 6/2008 | Zinn |
| 2008/0162250 A1 | 7/2008 | Carrion |
| 2008/0189624 A1 | 8/2008 | Chotai et al. |
| 2008/0243582 A1 | 10/2008 | Chen et al. |
| 2009/0125818 A1 | 5/2009 | Ritter et al. |
| 2009/0138283 A1 | 5/2009 | Brown |
| 2009/0164911 A1* | 6/2009 | Cox et al. .................. 715/751 |
| 2010/0217644 A1* | 8/2010 | Lyle et al. .................. 705/8 |
| 2011/0258153 A1 | 10/2011 | Kamar et al. |
| 2012/0023454 A1* | 1/2012 | Pieruschka .................. 715/853 |
| 2014/0372525 A1 | 12/2014 | Raghavan et al. |

OTHER PUBLICATIONS

Fulcrum's Surfboard—Search Technology for Internet, Newsbytes Inc., Mar 23, 1995.

Gage, Deborah, "Fulcrum Technologies Tries to stay ahead of Microsoft", Computer Reseller News, 1996.

Gustavson, Ron, "Compact Disc and Portable Webs", E Media Professional, vol. 9, No. 12, Dec. 1996.

Kramer, Matt, "Tests Find Notes Client Will Ease Wandering, Database Access", PC Week, vol. 14, No. 21, May 26, 1997.

Nadile, Lisa, "PC Expo to get Software Infusion", PC Week, vol. 13, No. 24, Jun. 17, 1996.

Oski, Jonathan A., Lotus Notes 4.5 Branches into Internet, Intranets, MacWeek, vol. 11, No. 8, Feb. 24, 1997.

Participation Status on Computer Calendar Systems, Research Disclosure, No. 298 Feb. 1989. Kenneth Mason Publications Ltd.

* cited by examiner

302 CALENDER EVENT | ← | //SAVE// | DISCARD | 320

304 EVENT TITLE: TRIP TO MOUNTAIN VIEW, CA

308 EVENT TITLE: 11/11/13 ▽

306 EVENT LOCATION: MOUNTAIN VIEW, CA ▽

310 EVENT TIME: ALL DAY ▽

314 EVENT PARTICIPANTS: ▽

312 EVENT DURATION: 5 DAYS ▽

316 EVENT DESIGNATION: PARENT ▽

318 DESCRIPTION:

SHOW ME AS  ○ AVAILABLE  ● BUSY

| 402 CALENDER EVENT | ← | //SAVE// 422 | DISCARD |

404
EVENT TITLE: [ BOOK MOUNTAIN VIEW FLIGHT ]

408
EVENT TITLE: [ 10/ 11/ 13 ▽ ]

410
EVENT TIME: [ 9 AM ▽ ]

412
EVENT DURATION: [ 15 MIN ▽ ]

406
EVENT LOCATION: [ ▽ ]

414
EVENT PARTICIPANTS: [ AMANDA ADMIN ▽ ]

416
EVENT DESIGNATION: [ CHILD ▽ ]

418
EVENT DEPENDENCY: [ CALENDER EVENT 302 ▽ ]

420
DESCRIPTION: [                    ]

SHOW ME AS    ○ AVAILABLE    ● BUSY

MANAGING SCHEDULE CHANGES FOR CORRELATED CALENDAR EVENTS

BACKGROUND

The disclosure relates generally to managing schedule changes for correlated calendar events in a calendar application.

Many users rely on electronic or online calendar applications to manage their schedules. Information regarding various upcoming activities can be entered by the user into a calendar application using sectioned blocks of time in the form of calendar events. The information stored as part of a calendar event can include the event title, event date, event time, event duration, event location, and participants for the calendar event. Some calendar applications allow users to repeat calendar events at defined time intervals in the form of recurrent events, but users are not provided with an opportunity to establish a relationship between different calendar events that enables coordinated schedule changes between calendar events.

SUMMARY

The disclosure relates to methods for managing schedule changes and cancellation of correlated calendar events in a calendar application.

One aspect of the disclosed embodiments is a method that includes receiving, at one or more computing devices, a first calendar event including an event designation as a parent event; receiving, at the one or more computing devices, a second calendar event including an event designation as a child event; receiving, at the one or more computing devices, an indication of event dependency between the second calendar event and the first calendar event; and if an indication is received that the first calendar event is cancelled, cancelling, using the one or more computing devices, the second calendar event.

Another aspect of the disclosed embodiments is a non-transitory storage medium including program instructions executable by one or more processors that, when executed, cause the one or more processors to perform operations. The operations include: receiving a first calendar event including an event designation as a parent event; receiving a second calendar event including an event designation as a child event; receiving an indication of event dependency between the second calendar event and the first calendar event; and if an indication is received that the first calendar event is cancelled, cancelling the second calendar event.

Another aspect of the disclosed embodiments is an apparatus that includes one or more processors and one or more memory devices for storing program instructions used by the one or more processors. The program instructions, when executed by the one or more processors, cause the one or more processors to: receive a first calendar event; receive a second calendar event; receive an indication of event dependency of the second calendar event on the first calendar event; and if an indication is received that the first calendar event is cancelled, cancel the second calendar event.

BRIEF DESCRIPTION OF THE DRAWINGS

The description herein makes reference to the accompanying drawings wherein like reference numerals refer to like parts throughout the several views, and wherein.

DETAILED DESCRIPTION

An improved electronic calendar application is described here. A user can hierarchically link separate calendar events, child to parent, in order to better manage schedule changes for the correlated calendar events. The link between calendar events can be based on an indication of event dependency between the two calendar events. Once at least two calendar events are linked, the link establishing that changes to the child calendar event are dependent upon changes to the parent calendar event, a scheduling system can manage coordinated schedule changes. In one example, when an indication is received that the parent calendar event is cancelled, the scheduling system can also cancel the child calendar event. If another example, when an indication is received that the parent calendar event is rescheduled, the scheduling system can also reschedule the child calendar event at a similar temporal interval.

Figure 1:
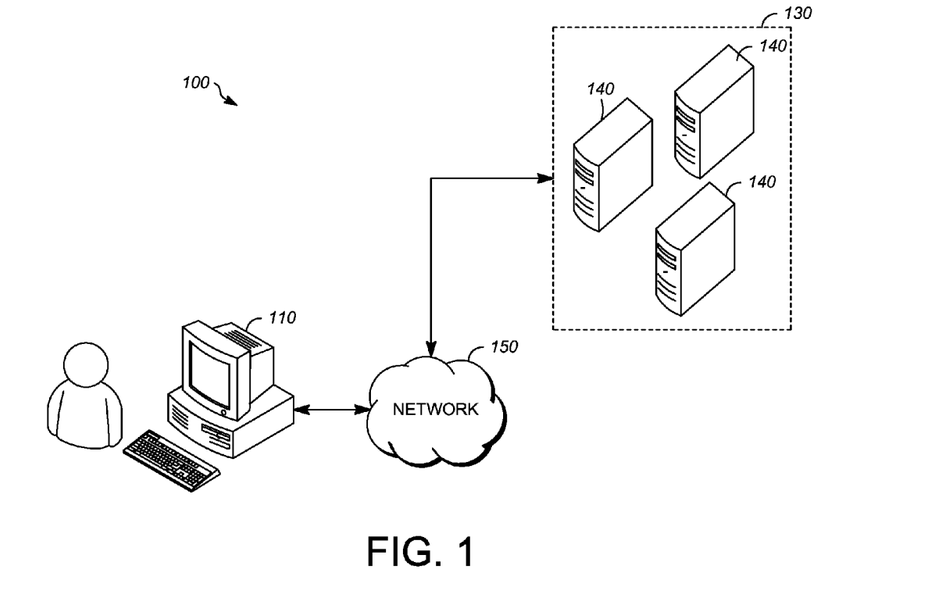
FIG. 1 is a block diagram showing an example of a system for managing schedule changes for correlated calendar events in a calendar application.

FIG. 1 is a block diagram showing an example of an environment 100 in which a system for managing schedule changes for correlated calendar events can be implemented. The environment 100 can include a user system 110 and a scheduling system 130. The user system 110 is representative of a large number (e.g. millions) of user systems that can be included in the environment 100. The user system 110 can be any manner of computer or computing device, such as a desktop computer, a laptop computer, a tablet computer, or a smart-phone (a computationally-enabled mobile telephone). The scheduling system 130 can be implemented using one or more server computers 140. The user system 110 and the scheduling system 130 can each be implemented as a single system, multiple systems, distributed systems, or in any other form.

The systems, services, servers, and other computing devices described here are in communication via a network 150. The network 150 can be one or more communications networks of any suitable type in any combination, including wireless networks, wired networks, local area networks, wide area networks, cellular data networks, and the internet.

The scheduling system 130 provides a scheduling service to the user system 110. In some implementations, all of the operations described here with respect to scheduling and managing schedule changes for calendar events are performed at the scheduling system 130. In other implementations, some of the operations described here are performed at the scheduling system 130, and the other operations are performed at the user system 110.

Figure 2:
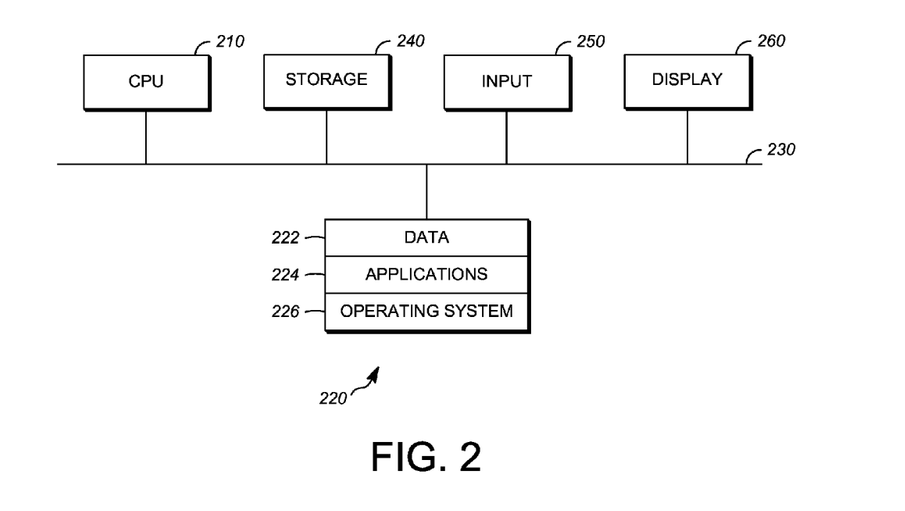
FIG. 2 is a block diagram showing an example of a server computer.

FIG. 2 is a block diagram of an example of a hardware configuration for the one or more server computers 140. The same hardware configuration or a similar hardware configuration can be used to implement the user system 110. Each server computer 140 can include a CPU 210. The CPU 210 can be a conventional central processing unit. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

Each server computer 140 can include memory 220, such as a random access memory device (RAM). Any other suitable type of storage device can be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described herein.

A storage device 240 can be optionally provided in the form of any suitable computer readable medium, such as a hard disk drive, a memory device, a flash drive, or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as a liquid crystal display (LCD) or a cathode-ray tube (CRT), allows output to be presented to a user, for example, in response to receiving a video signal.

Although FIG. 1 depicts the CPU 210 and the memory 220 of each server computer 140 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of each of each server computer 140 can be composed of multiple buses. Further, the storage device 240 can be directly coupled to the other components of the respective server computer 140 or can be accessed via a network and can comprise a single integrated unit such as a memory card or multiple units such as multiple memory cards. The one or more server computers 140 can thus be implemented in a wide variety of configurations.

Figure 3:
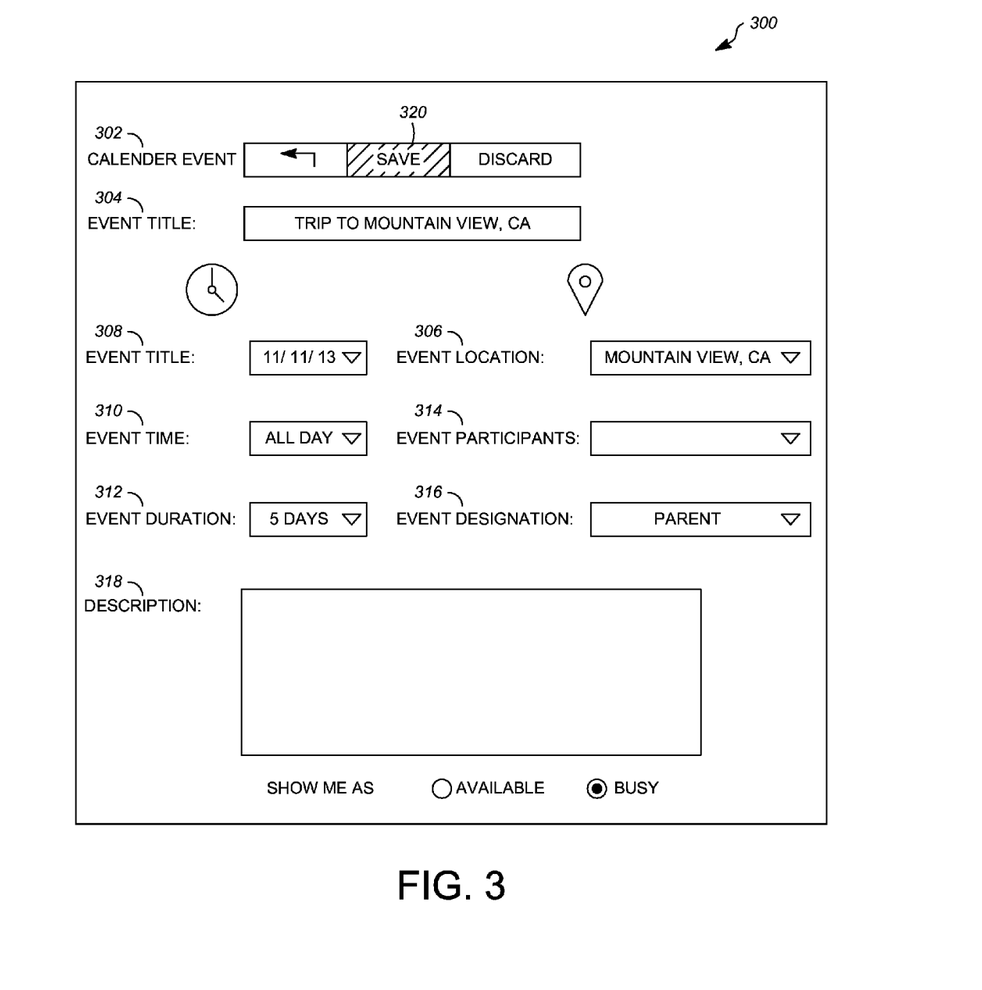
FIG. 3 is an illustration showing an example calendar interface for entering calendar events.

FIG. 3 is an illustration showing an example calendar interface 300 for entering calendar events. For example, calendar event 302 can be entered at the user system 110. The calendar event 302 displayed on the calendar interface 300 includes information fields having user entry and/or drop-down selection configurations. The information fields can include a calendar event title field 304, a calendar event location field 306, a calendar event date field 308, a calendar event time field 310, a calendar event duration field 312, a calendar event participants field 314, a calendar event designation field 316, and a calendar event description field 318. The calendar interface 300 can also include a soft button 320 for saving the calendar event 302 to the scheduling system 130 after the information fields have been partially or fully populated.

The calendar event title field 304 can be populated with information related to the type of calendar event 302 being created. For example, the text "Trip to Mountain View, Calif." can be entered by the user into the calendar event title field 304 to denote that this calendar event 302 is designed to block off time in the user's calendar for a trip to Northern California. Other example entries into the calendar event title field 304 can include such text as "Florida Vacation," "Engineering Conference," "Dinner with John," etc. The scheduling system 130 can also be configured to populate other information fields based on the text entered into the calendar event title field 304.

In one example of suggested information field population, when the text "Mountain View, Calif." is entered in the calendar event title field 304, the scheduling system 130 could be configured to suggest Mountain View, Calif. for population of the calendar event location field 306. In another example, when the user enters the text "Dinner with John" in the calendar event title field 304, the scheduling system 130 could be configured to suggest one or more of the user's phone or e-mail contacts named John for population of the calendar event participants field 314.

The calendar event location field 306 can be populated with information denoting the specific or general location for the calendar event 302. For example, the calendar event location field 306 can be populated with the name of a city, geo-spatial coordinates, a museum, restaurant, or retail store. If the calendar event location field 306 is populated with a specific place, the scheduling system 130 can determine additional relevant information about the entry within the calendar event location field 306, such as operating hours, address, contact information, etc. for use within the other information fields in the calendar event 302 as well as for use in managing correlated calendar events. For example, evening-only operating hours, i.e. temporal access information, associated with a specific restaurant populated within the calendar event location field 306 could be used by the scheduling system 130 to determine an appropriate time for rescheduling the calendar event 302 if a correlated calendar event is rescheduled.

The calendar event date field 308, calendar event time field 310, and calendar event duration field 312 can be populated by the user to specify the temporal range over which the calendar event 302 occurs. Other configurations for these temporal information fields are also possible. Continuing the FIG. 3 example, the user has entered that the "Trip to Mountain View, Calif." starts on Nov. 11, 2013, in the event date field 308, that the calendar event 302 occurs "All Day" in the event time field 310, and that the calendar event 302 lasts for "5 Days" in the event duration field 312. These entries by the user indicate that calendar event 302 lasts from Nov. 11, 2013 to Nov. 15, 2013. The scheduling system 130 can also be configured to populate the calendar event time field 310 or calendar event duration field 312 based on previous similar calendar events created by the same user, based on calendar events created by contacts of the user, or based on calendar events created by other users handled by the scheduling system 130.

The calendar event participants field 314 can be populated by the user with a contact's name or other contact information when the user wishes to invite another person to the calendar event 302. The calendar event participants field 314 can also be populated by the scheduling system 130 if a contact's name or other information relevant to the contact appears in the text entered into the calendar event title field 304. In the FIG. 3 example, no names have been entered by the user into the event participants field 314 as the calendar event 302 is meant only to denote the duration of the "Trip to Mountain View, Calif." within the user's own calendar.

The calendar event designation field 316 can be populated by the user to specify the hierarchy level of the calendar event 302. The hierarchy level populated within the calendar event designation field 316 is used to designate whether the calendar event 302 is configured to manage or control schedule changes or cancellations of other calendar events or is configured to be subject to the management or control of another calendar event. In this example, the calendar event designation field 316 is populated with "parent," indicating that calendar event 302 is configured to manage or control schedule changes or cancellations of other, dependent calendar events, for example, those with calendar event designations of "child." The calendar event designation field 316 can also be left blank if no relationship between calendar events is intended to be established. Alternatively, the calendar event designation field 316 can be absent, allowing the hierarchy of calendar events to be based only on event dependency. Event designation and event dependency is further described in reference to FIG. 4.

The calendar event description field 318 can be populated with additional text describing the "Trip to Mountain View, Calif." For example, the user could list reference phone numbers for hotels where the user will be staying during the trip or list reservation numbers for flights associated with the trip. In the example calendar event 302 of FIG. 3, no additional text has been entered in the calendar event description field 318. Finally, the soft button 320 can be used to save the calendar event 302 once one or more of the information fields has been populated. Once a calendar event 302 is saved, the scheduling system 130 can store the calendar event 302 within the user's calendar application.

Figure 4:
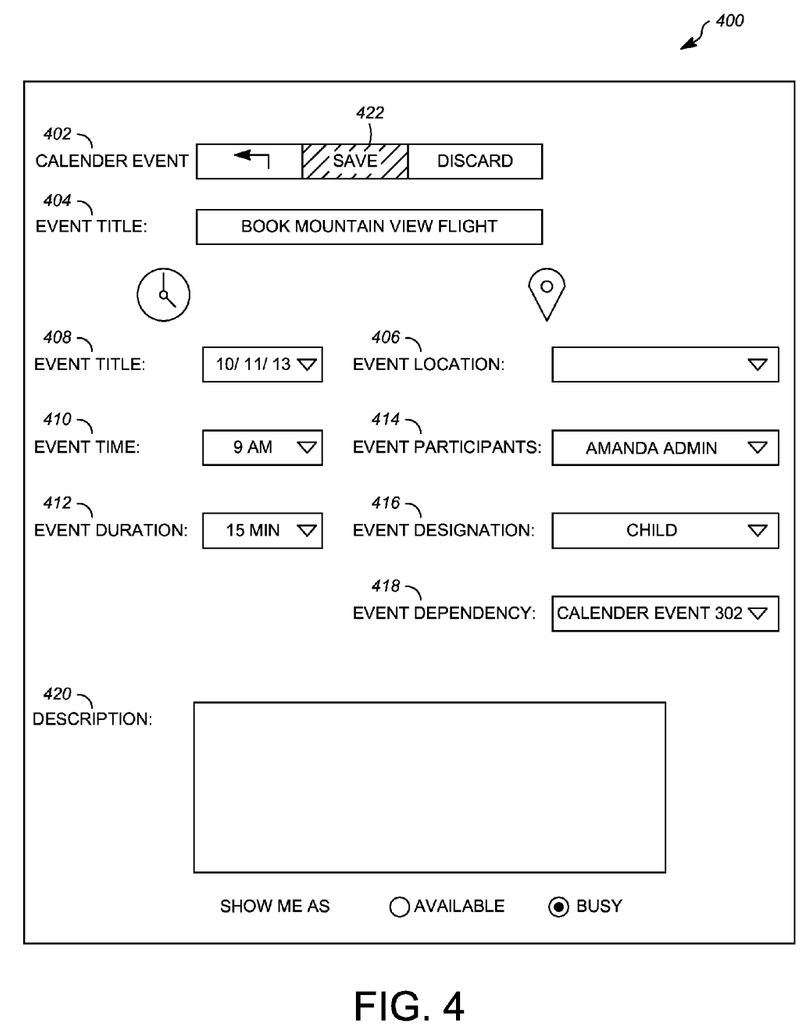
FIG. 4 is an illustration showing another example calendar interface for entering calendar events.

FIG. 4 is an illustration showing another example calendar interface 400 for entering calendar events. For example, calendar event 402 can be entered at the user system 110. The calendar event 402 displayed on the calendar interface 400 includes the following information fields: a calendar event title field 404, a calendar event location field 406, a calendar event date field 408, a calendar event time field 410, a calendar event duration field 412, a calendar event participants field 314, a calendar event designation field 316, a calendar event dependency field 418, and a calendar event description field 420. As described in reference to FIG. 3, in one embodiment the calendar event designation field 416 can be absent, allowing a recursive hierarchy based only on the calendar event dependency field 418. The calendar interface 400 can also include a soft button 422 for saving the calendar event 402 to the scheduling system 130 after the information fields have been partially or fully populated.

The calendar event title field 404 can be populated with information related to the type of calendar event 402 being created. For example, the text "Book Mountain View Flight" can be entered by the user into the calendar event title field 404 to denote that this calendar event 402 is designed to block off time in the user's calendar for the user to schedule a flight to Northern California. Given the similarity of the content of this event title field 404 to the content of the event title field 304 for the calendar event 302 of FIG. 3, the scheduling system 130 could be configured to suggest "child" for population of the calendar event designation field 416. The scheduling system 130 could also be configured to suggest "calendar event 302" for population of the calendar event dependency field 418, that is, the scheduling system 130 could suggest to the user that calendar event 402 be designated as a child calendar event to calendar event 302.

In this example, no information is entered into the calendar event location field 406 as the calendar event 402 can be accomplished using a computing device from any location. However, the calendar event date field 408, calendar event time field 410, and calendar event duration field 412 can be populated by the user to specify the temporal range over which the calendar event 402 occurs. Continuing the FIG. 4 example, the user has entered that the "Book Mountain View Flight" calendar event 402 should be completed on Oct. 11, 2013, as indicated in the event date field 408, that the calendar event 402 occurs at "9 AM" as indicated in the event time field 410, and that the calendar event 402 lasts for "15 MIN" as indicated in the event duration field 412. These entries by the user indicate that calendar event 402 is scheduled for one month before the "Trip to Mountain View, Calif." calendar event 302 starting Nov. 11, 2013.

The calendar event participants field 414 can be populated by the user with the text "Amanda Admin" indicating that the user wishes to invite his contact Amanda Admin to the calendar event 402. In the FIG. 4 example, Amanda Admin can be an employee of the user tasked with making the flight reservations for the user based on the calendar event 402. As described in reference to calendar event 302 and FIG. 3, the calendar event participants field 414 can also be populated by the scheduling system 130 if a contact's name or other information relevant to the contact appears in the text entered into the calendar event title field 404. Alternatively, the calendar event participants field 414 can be left blank.

The calendar event designation field 416 can be populated by the user with the text "child," indicating that calendar event 402 is configured be managed or controlled based on the schedule changes or cancellations of another, higher level calendar event, for example, calendar event 302 with the event designation field 316 populated with "parent." Once the user designates calendar event 402 as a child event dependent upon a parent event, the event dependency field 418 can be offered or enabled, allowing the user to choose which calendar event will manage or control calendar event 402, that is, allowing the user to establish event dependency between two calendar events. Alternatively, the calendar event designation field 416 can be absent, and the hierarchy of calendar events can be based only on the entry in the event dependency field 418. For example, the user can populate the event dependency field 418 with a reference to the calendar event upon which calendar event 402 is dependent, in this example, the text "Calendar Event 302." Any designation of the parent calendar event can be used to populate the event dependency field 418. Another example entry for population of the event dependency field 418 can be the text from the event title field 304, "Trip to Mountain View, Calif." The population of the event dependency field 418 is thus used to create a link, or correlate, two (or more) calendar events.

The link, or correlation, of event dependency created between calendar event 402 and calendar event 302 based on the entry present within with event dependency field 418 can indicate to the scheduling system 130 that changes affecting calendar event 302, the parent event, will also affect calendar event 402, the child calendar event. For example, if the scheduling system 130 receives an indication that parent calendar event 302 is cancelled, the scheduling system 130 can be configured to automatically cancel the child calendar event 402. In the example of FIGS. 3 and 4, if the "Trip to Mountain View, Calif." is cancelled, the "Book Mountain View Flight" is also logically no longer necessary in the user's calendar. Alternatively, the scheduling system 130 can be configured to generate a reminder for the user to review and/or cancel the child calendar event 402 if the parent calendar event 302 is cancelled.

The calendar event description field 420 can be populated with additional text describing the "Book Mountain View Flight" calendar event 402. For example, the user could list preferred airlines or preferred flight times that could be used by Amanda Admin (the contact listed in the event participants field 414) when booking the flight to Mountain View, Calif. In the example calendar event 402 of FIG. 4, no additional text has been entered in the calendar event description field 420. Finally, the soft button 422 can be used to save the calendar event 402 once one or more of the information fields has been populated. Once a calendar event 402 is saved, the scheduling system 130 can store the calendar event 402 within the user's calendar application.

In another example of managing schedule changes between correlated calendar events, the scheduling system 130 can be configured to reschedule child calendar events based on the rescheduling of parent calendar events. For example, if parent calendar event 302 is moved from Nov. 11, 2013 to Dec. 11, 2013, a one-month temporal interval, the child calendar event 402 can also be rescheduled for the same one-month temporal interval from Oct. 11, 2013 to Nov. 11, 2013, keeping the original temporal spacing between the correlated calendar events 302, 402 at one-month. The temporal link between the parent calendar event 302 and the child calendar event 402 is thus maintained without direct intervention by the user.

In addition to temporal intervals, other information can be used to determine when to reschedule child calendar events based on the rescheduling of parent calendar events. For example, if a child calendar event includes event participants, the scheduling system 130 can be configured to review calendar information for event participants when rescheduling any child calendar events. In the example shown in FIG. 4, Amanda Admin is listed in the calendar event participants field 414. If rescheduling parent calendar event 302 one month into the future would coincide with a date that Amanda Admin is scheduled to be out of the office in the morning per her calendar, the scheduling system 130 could be configured to suggest or automatically reschedule child calendar event 402 several hours later on Nov. 11, 2013, at a time that Amanda Admin is free to take care of the booking. Thus, the scheduling system 130 can take both the temporal interval and calendar information for event participants into account when rescheduling a child calendar event.

Event location information can also be used in conjunction with temporal intervals to determine when to reschedule child calendar events based on the rescheduling of parent calendar events. For example, when rescheduling one or more child calendar events based on the rescheduling of a parent calendar event, the scheduling system 130 can determine whether any of the child calendar events include an event location having associated temporal access information. Temporal access information can include, for example, the days and times that the event location is open for business. If the temporal interval associated with the rescheduling of a parent calendar event would lead to rescheduling a child calendar event to a time when the temporal access information for the event location for the child calendar event indicates non-operating hours, the scheduling system 130 can be configured to shift the event date or event time for the child calendar event accordingly to meet a date or time when the event location for the child calendar event is open.

In another example of managing schedule changes between correlated calendar events, the scheduling system 130 can be configured to review child calendar event information fields including the event title field, the event location field, the event description field, etc. when rescheduling a child calendar event based on the rescheduling of a parent calendar event in order to determine whether the child calendar event cannot be rescheduled based on the temporal interval associated with the parent calendar event. For example, if the child calendar event includes reservation information for a concert or an opera, and another show for the concert or opera is not available at a time proximate to the temporal interval from the original time for the child calendar event, the scheduling system 130 can be configured to cancel the child event.

In the example where a child calendar event is cancelled because no matching event is available based on the temporal interval, the scheduling system 130 can be configured to determine whether a replacement event is available proximate to the child calendar event location and proximate to the temporal interval from the child calendar event original event time. Continuing the above example, if the child calendar event was an opera, and that opera is not available at the temporal interval from the original event time, the scheduling system 130 can determine that another opera is being offered in the same location at the temporal interval and can suggest to the user that new reservations for the new opera could be made and a new calendar event created. Alternatively, the scheduling system 130 could propose to the user that the child calendar event could be updated to reflect the booking for the new opera. If the scheduling system 130 is proposing this type of change to the child calendar event or addition of a new, replacement calendar event, approval can be sought from the user before making the change.

Figure 5:
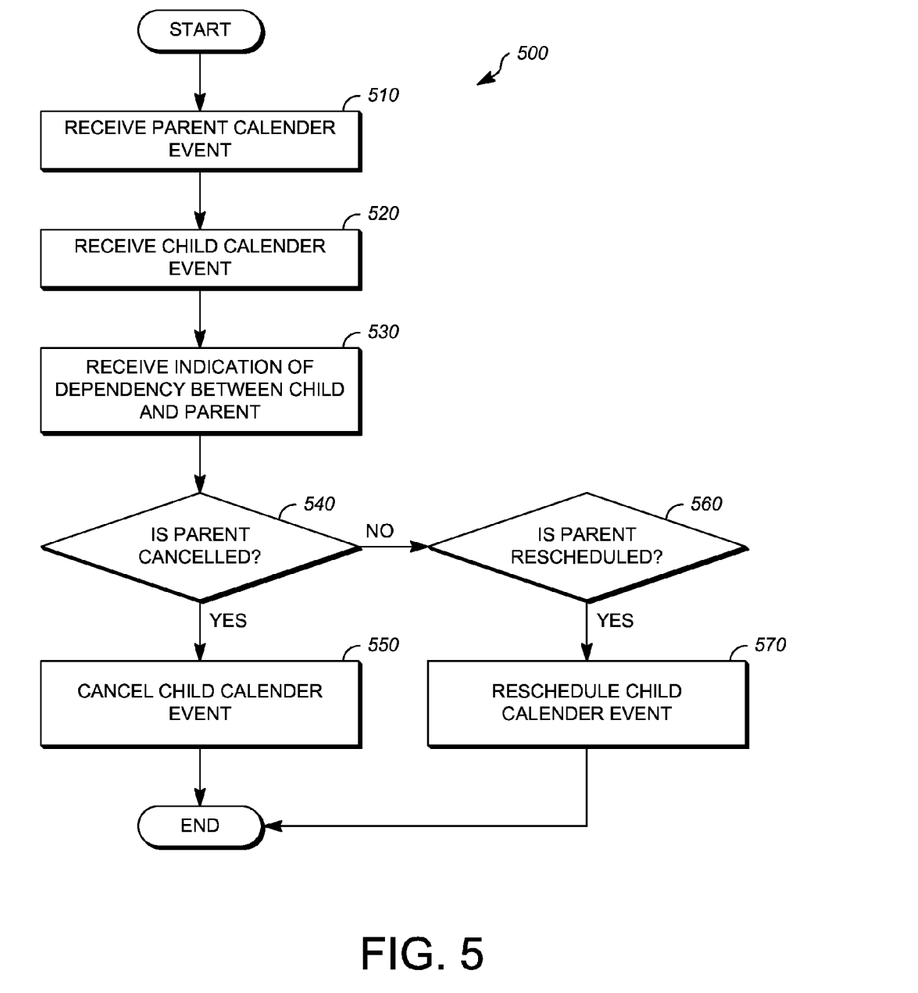
FIG. 5 is a flow chart showing an example of a process for managing schedule changes for correlated calendar events in a calendar application.

FIG. 5 is a flow chart showing an example of a process 500 for managing schedule changes for correlated calendar events in a calendar application. The operations described in connection with the process 500 can be performed at one or more computers, such as at the one or more server computers 140 of the scheduling system 130. As used herein, the phrases "one or more computers," "one or more computing devices," "one or more server computers," and similar phrases include all of the computers or groups of computers that participate in performing the process. For example, the process 500 can be performed at one or more computers in an implementation where each of the operations described herein is performed using a different group of computers, where each group of computers cooperatively performs the respective operation of the process 500.

When an operation is performed by one or more computers, it is completed when it is performed by one computer. The operations described in connection with the example process 500 can be embodied as a non-transitory computer readable storage medium including program instructions executable by one or more processors that, when executed, cause the one or more processors to perform the operations. For example, the operations described in connection with the example process 500 could be stored at the memory 220 of a respective one of the server computers 140 and be executable by the CPU 210 thereof.

At operation 510, a first calendar event is received, for example, at the one or more server computers 140 of the scheduling system 130. The first calendar event can include an event designation as a parent event, that is, as a calendar event upon which other calendar events can be dependently linked.

At operation 520, a second calendar event is received, for example, at the one or more server computers 140 of the scheduling system 130. The second calendar event can include an event designation as a child event, that is, as a calendar event configured for dependency on another calendar event.

At operation 530, an indication of event dependency between the second calendar event and the first calendar event is received, for example, at the one or more server computers 140 of the scheduling system. The indication of event dependency can be in the form of a selection of the first calendar event within an event dependency information field present within the calendar interface for the second calendar event. Other methods of indicating event dependency are also possible.

At decision block 540, the scheduling system 130 determines whether an indication has been received that the first calendar event is cancelled. If an indication of cancellation has been received for the first calendar event, the process 500 moves to operation 550, and the second calendar event is also cancelled by the scheduling system 130. The cancellation can be automatic, or the user can be presented with a request regarding cancellation of the second calendar event by the scheduling system 130. Once the second calendar event, in this example, the child calendar event, is cancelled, the process 500 ends.

If no indication is received that the first calendar event is cancelled, the process 500 can move to decision block 560, where the scheduling system 130 determines whether the first calendar event, the parent calendar event, has been rescheduled. If an indication is received that the first calendar event has been rescheduled, for example, at a temporal interval from a first event time, the process 500 moves to operation 570, and the second calendar event, the child calendar event, is also rescheduled. The scheduling system 130 can be configured to reschedule or cancel the second calendar event based on the temporal interval from the first calendar event, based on information regarding event participants in the second calendar event, based on information regarding temporal access information for an event location in the second calendar event, and/or based on information regarding the inability to reschedule the second calendar event. Once the second calendar event, in this example, the child calendar event, is rescheduled, the process 500 ends.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method comprising:
   receiving, at one or more computing devices, a first calendar event including an event designation as a parent event, wherein the first calendar event is scheduled to occur during a first temporal range;
   receiving, at the one or more computing devices, a second calendar event including an event designation as a child event, wherein the second calendar event is scheduled to occur during a second temporal range that is temporally spaced from the first temporal range;
   receiving, at the one or more computing devices, an indication of event dependency between the second calendar event and the first calendar event; and
   if an indication is received that the first calendar event is cancelled, cancelling, using the one or more computing devices, the second calendar event.

2. The method of claim 1, wherein the first calendar event includes a first event time and the second calendar event includes a second event time, further comprising:
   receiving, at the one or more computing devices, an indication that the first calendar event is rescheduled at a temporal interval from the first event time.

3. The method of claim 2, further comprising:
   rescheduling, using the one or more computing devices, the second calendar event from the second event time based on the temporal interval.

4. The method of claim 2, further comprising:
   determining, using the one or more computing devices, whether the second calendar event includes event participants;
   if the second calendar event does not include event participants, rescheduling, using the one or more computing devices, the second calendar event from the second event time based on the temporal interval; and
   if the second calendar event includes event participants, rescheduling, using the one or more computing devices, the second calendar event from the second event time based on the temporal interval and calendar information for the event participants.

5. The method of claim 2, wherein the second calendar event includes a second event location, further comprising:
   determining, using the one or more computing devices, whether the second event location includes temporal access information;
   if the second event location does not include temporal access information, rescheduling, using the one or more computing devices, the second calendar event from the second event time based on the temporal interval; and
   if the second event location includes temporal access information, rescheduling, using the one or more computing devices, the second calendar event from the second event time based on the temporal interval and the temporal access information for the second event location.

6. The method of claim 2, further comprising:
   if the second calendar event cannot be rescheduled based on the temporal interval, cancelling, using the one or more computing devices, the second calendar event.

7. The method of claim 6, wherein the second calendar event includes a second event location, further comprising:
   determining, using the one or more computing devices, whether a replacement event is available proximate to the second event location and proximate to the temporal interval from the second event time; and
   if a replacement event is available, generating, using the one or more computing devices, a replacement calendar event including a replacement event time and a replacement event location.

8. A non-transitory storage medium including program instructions executable by one or more processors that, when executed, cause the one or more processors to perform operations, the operations comprising:
   receiving a first calendar event including an event designation as a parent event, wherein the first calendar event is scheduled to occur during a first temporal range;
   receiving a second calendar event including an event designation as a child event, wherein the second calendar event is scheduled to occur during a second temporal range that is temporally spaced from the first temporal range;
   receiving an indication of event dependency between the second calendar event and the first calendar event; and
   if an indication is received that the first calendar event is cancelled, cancelling the second calendar event.

9. The non-transitory storage medium of claim 8, wherein the first calendar event includes a first event time and the second calendar event includes a second event time, the operations further comprising:
   receiving an indication that the first calendar event is rescheduled at a temporal interval from the first event time.

10. The non-transitory storage medium of claim 9, the operations further comprising:
    rescheduling, using the one or more computing devices, the second calendar event from the second event time based on the temporal interval.

11. The non-transitory storage medium of claim 9, the operations further comprising:
    determining whether the second calendar event includes event participants;
    if the second calendar event does not include event participants, rescheduling the second calendar event from the second event time based on the temporal interval; and
    if the second calendar event includes event participants, rescheduling the second calendar event from the second event time based on the temporal interval and calendar information for the event participants.

12. The non-transitory storage medium of claim 9 wherein the second calendar event includes a second event location, the operations further comprising:
    determining whether the second event location includes temporal access information;
    if the second event location does not include temporal access information, rescheduling the second calendar event from the second event time based on the temporal interval; and
    if the second event location includes temporal access information, rescheduling the second calendar event from the second event time based on the temporal interval and the temporal access information for the second event location.

13. The non-transitory storage medium of claim 9, the operations further comprising:
    if the second calendar event cannot be rescheduled based on the temporal interval, cancelling the second calendar event.

14. The non-transitory storage medium of claim 13, wherein the second calendar event includes a second event location, the operations further comprising:
    determining whether a replacement event is available proximate to the second event location and proximate to the temporal interval from the second event time; and
    if a replacement event is available, generating a replacement calendar event including a replacement event time and a replacement event location.

15. An apparatus, comprising:
    one or more processors; and
    one or more memory devices for storing program instructions used by the one or more processors, wherein the program instructions, when executed by the one or more processors, cause the one or more processors to:
        receive a first calendar event, wherein the first calendar event is scheduled to occur during a first temporal range;
        receive a second calendar event, wherein the second calendar event is scheduled to occur during a second temporal range that is temporally spaced from the first temporal range;
        receive an indication of event dependency of the second calendar event on the first calendar event; and
        if an indication is received that the first calendar event is cancelled, cancel the second calendar event.

16. The apparatus of claim 15, wherein the first calendar event includes a first event time and the second calendar event includes a second event time, the one or more processors further configured to:
    receive an indication that the first calendar event is rescheduled at a temporal interval from the first event time.

17. The apparatus of claim 16, the one or more processors further configured to:
    determine whether the second calendar event includes event participants;
    if the second calendar event does not include event participants, reschedule the second calendar event from the second event time based on the temporal interval; and
    if the second calendar event includes event participants, reschedule the second calendar event from the second event time based on the temporal interval and calendar information for the event participants.

18. The apparatus of claim 16 wherein the second calendar event includes a second event location, the one or more processors further configured to:
    determine whether the second event location includes temporal access information;
    if the second event location does not include temporal access information, reschedule the second calendar event from the second event time based on the temporal interval; and
    if the second event location includes temporal access information, reschedule the second calendar event from the second event time based on the temporal interval and the temporal access information for the second event location.

19. The apparatus of claim 16, the one or more processors further configured to:
    if the second calendar event cannot be rescheduled based on the temporal interval, cancel the second calendar event.

20. The apparatus of claim 19, wherein the second calendar event includes a second event location, the one or more processors further configured to:
    determine whether a replacement event is available proximate to the second event location and proximate to the temporal interval from the second event time; and
    if a replacement event is available, generate a replacement calendar event including a replacement event time and a replacement event location.

* * * * *